Figure 1:
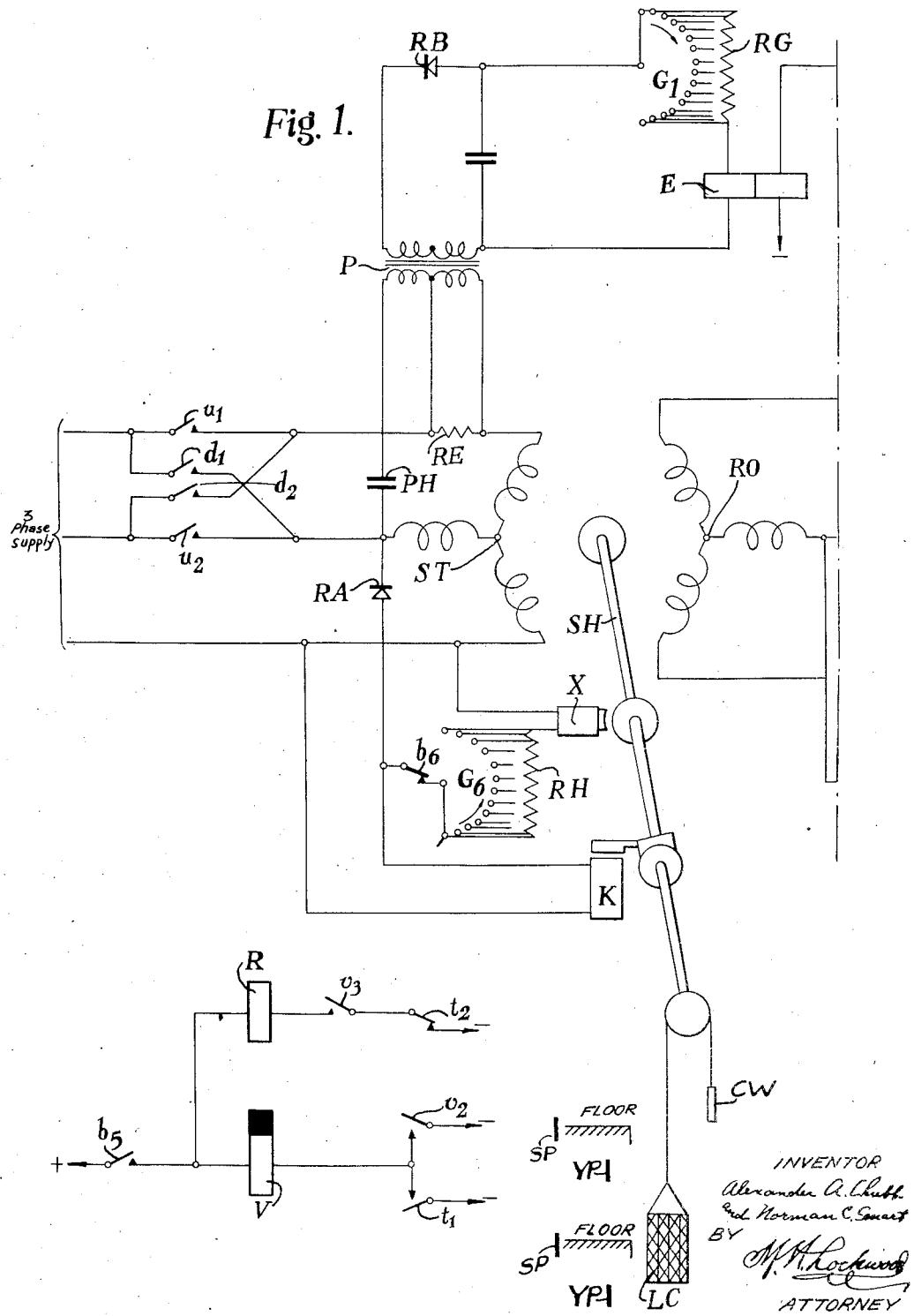

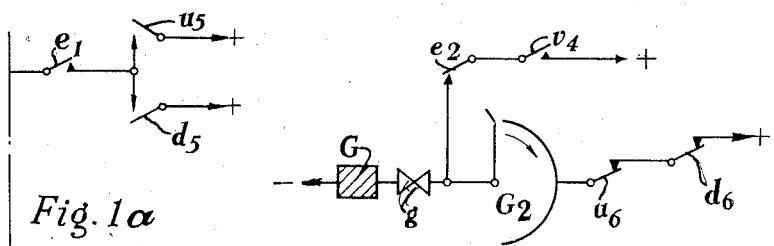
Fig. 1a
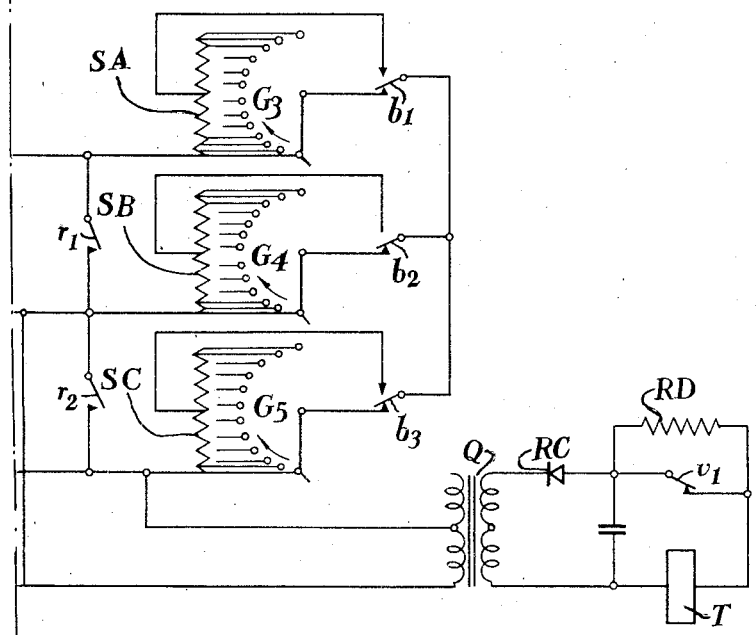
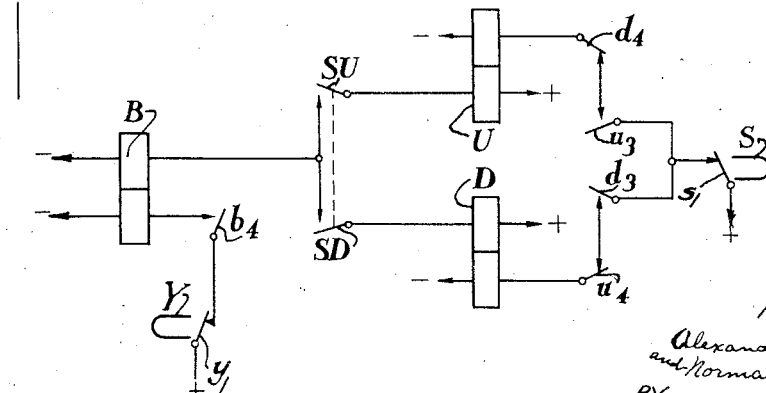

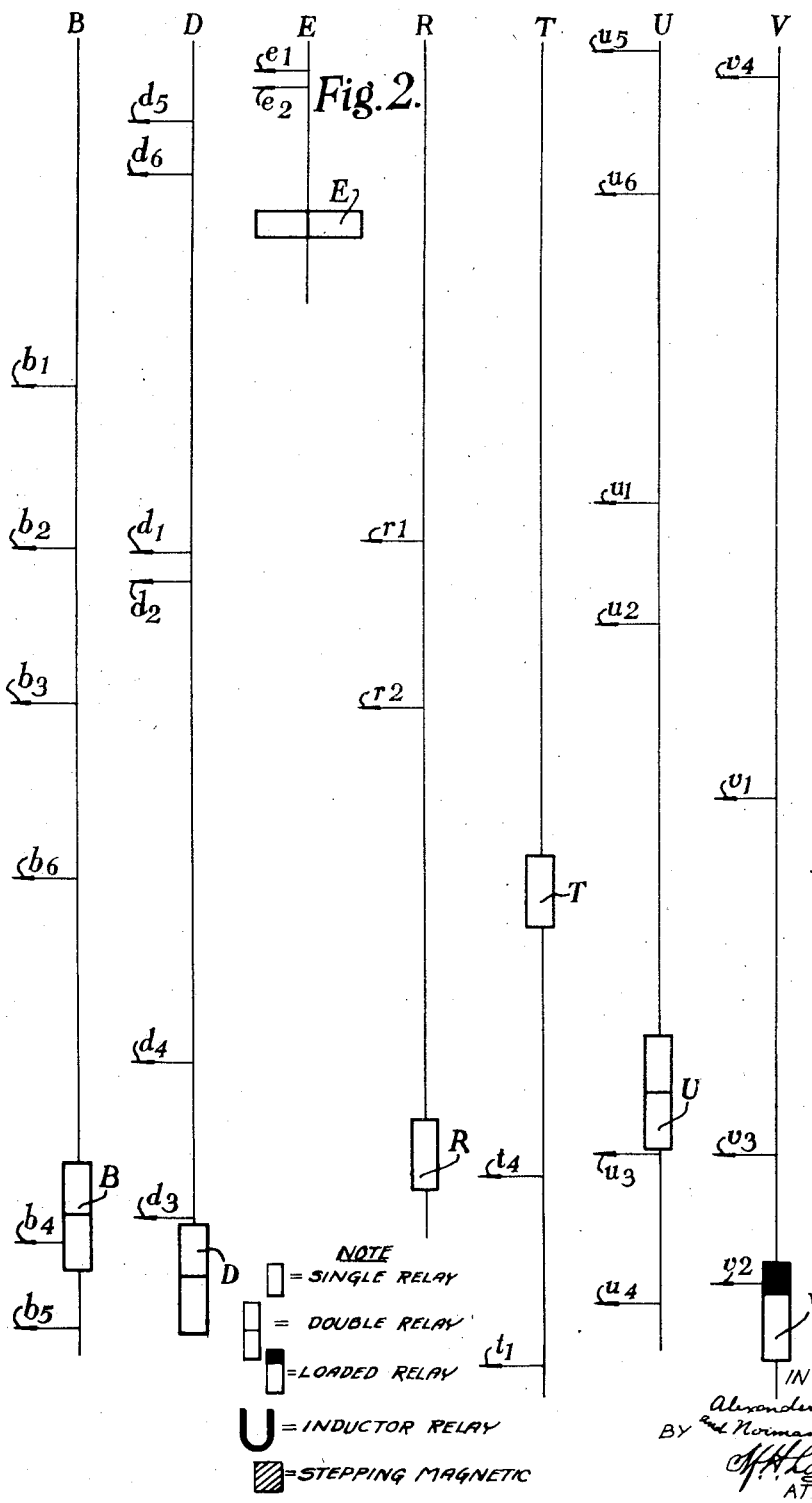

Patented May 17, 1938

2,117,838

UNITED STATES PATENT OFFICE 2,117,838

SYSTEM OF CONTROL FOR ELECTRICALLY OPERATED LIFTS

Alexander Albert Chubb, Coventry, and Norman Carol Smart, Birley, near Coventry, England, assignors to The General Electric Company Limited, London, England Application April 23, 1936, Serial No. 75,968
In Great Britain April 24, 1935

10 Claims. (Cl. 172—152)

Our invention relates to systems of control for electrically operated lifts and has for its object provision of means whereby levelling of a lift at a floor is rendered substantially independent of the load.

Our invention is more especially concerned with controlling systems for lifts in which the driving means is motor operated from alternating supply mains. Hitherto, such motors have either been of the pole-charging variety or have been provided with commutators, this latter giving the familiar series characteristics. Both of these forms are, however, of greater cost and less reliability than the simpler and more robust induction motor. The objection to the use of the latter motor, however, is that its shunt characteristic when the rotor is short-circuited is quite unsuitable for the provision of the increase of speed necessary when the lift is accelerated and for the decrease of speed when the lift is coming to rest, though to some extent this disadvantage has been overcome by means of a wound rotor and the use of series resistances whereby the slip of the motor may be varied.

This arrangement of a wound rotor and series resistances, though permitting a range of speed to be obtained from an induction motor, is not entirely suitable for lift practice as the loads encountered by the motor are of very varying character and may either oppose or help the motor so that one position of the gear controlling the variable resistances in the rotor circuit does not correspond with a particular degree of rotor slip under all circumstances, with the result that the acceleration and deceleration of a lift driven by a motor of this pattern would both vary very considerably with the load present in the lift.

According, therefore to our invention, in a system of control for an electrically driven lift employing an induction motor, the weight present in the lift is measured (according to the current required for acceleration) after every start from a floor by means which during deceleration control the amount of impedance to be inserted in the rotor circuit.

The said means may also control the degree of energization of a slow-acting brake such as an eddy current device which is arranged to be applied during the deceleration period.

In an embodiment of our system of lift control, a step by step or wiper switch of the type used in telephone systems has its wiper positioned by the lift after the latter has started from rest, at a point corresponding to the load. When the lift commences to decelerate the position of the wiper of the step by step switch determines the value of resistance which is inserted in the rotor circuit and hence the torque applied to the left carriage during deceleration. In the present instance a brake is also applied at the commencement of the decelerational period, the value of the resistance left in the rotor circuit by the wiper switch position being such as to produce a turning moment which, combined with the brake retarding force and with the load in the lift, is such as to bring the speed of the lift carriage to such a low value at the required floor level that the application of a further or holding brake to stop the lift results in accurate levelling.

The brake used during deceleration is preferably one which employs eddy currents. Application of the deceleration brake is caused by applying potential to the energizing coils of the brake, these latter having such a high inductance that the building up of current in them is relatively slow. By this means a gradual increase of braking torque is provided rather than a sudden application.

Reference should now be made to the accompanying drawings Figures 1 and 1a of which shows a divorced contact drawing of an embodiment of our system of control of an electrically driven lift, while Figure 2 is a "code sheet" or key sheet for Figure 1.

The lift driving motor consists of a rotor RO fixed to a driving shaft SH, which carries other devices referred to later. The motor also includes stator windings ST connected through suitable switching devices (contacts $n_1$, $u_2$ or $d_1$, $d_2$) to a three phase supply as shown. The rotor currents at starting and during deceleration are adapted to be controlled by means of resistances SA, SB and SC, the values of these resistances during deceleration being determined by the associated switch banks G3, G4, G5 and wipers, or in cooperation with the relay contacts connected thereto.

When the lift is stationary, the coil of a holding brake K is de-energized, and its brake shoe clamps the drum on the lift driving shaft solidly. During movement of the lift away from a floor the coil of this holding brake is energized and the shoe releases the shaft allowing the carriage LC to move in the lift well. During deceleration of the lift the speed of the carriage is reduced, first by the wiper resistances SA, SB, SC in cooperation with the eddy currents in the deceleration brake X and then the carriage is finally brought to a standstill at the floor by release of the shoe of the holding brake K. A typical traverse of the lift will now be described so that the operation of the circuit may be made manifest.

Assuming that the lift is at the bottom of the shaft and it is required to travel to an upper floor, the manual control up key SU is closed. This key is manually operated, and when operated is held closed until some distance before the required floor is reached. It will be noted that it is mechanically inter-locked with the corresponding down control key SD, closure of which causes the lift to travel downwards, so that only one key can be operated at a time.

Closure of the up control key SU causes control relay B and up relay U to operate. Their contacts perform the following functions:—

$b_1$, $b_2$ and $b_3$ by moving to their upper positions adjust the values of resistances SA, SB and SC for starting the driving motor.

$b_4$ by closing locks relay B operated to the contact of inductor relay Y (see later).

$b_5$ prepares an operating path for resistance relay R and switch starting V.

$b_6$ by opening prevents operation of the eddy current deceleration brake X.

$u_1$ and $u_2$ close circuits for the stator windings ST so as to drive the lift in an upward direction.

$u_3$ closing locks up relay U operated to the contact of inductor stop relay S (see later).

$u_4$ opening prevents false operation of relay D.

$u_5$ closing prepares a locking circuit for lift load relay E.

$u_6$ opening breaks a self-interrupting circuit for the stepping switch magnet G.

Two actions now take place simultaneously. Large currents flow in the rotor windings (if the lift load is an opposing one), these currents ($b_1$, $b_2$, $b_3$, in upper positions) passing through the upper contacts and through the starting resistances SA, SB and SC, and being limited by them. In addition, in view of its connection across the rotor circuit a potential appears across the primary of the transformer Q, this potential being rectified by the rectifier RC and thereafter operating initiating relay T via the short circuiting contact $v_1$.

$t_1$ closing operates switch starting relay V to position $b_5$.

$t_2$ opening prevents operation of rotor resistance relay R when contact $v_3$ closes.

$v_1$ opening removes a short circuit across the resistance RD reducing the current through relay T, though this relay does not release at the moment.

$v_2$ closing provides a holding current which locks switch starting relay V operated.

$v_4$ closes a self-interrupting circuit of the switch stepping magnet G through contact $e_2$ already closed and interrupting contact $g$. The switch commences to step the wipers $G_1$—$G_6$ rapidly over their associated contact banks.

In the meantime, the primary of the transformer P is traversed by two currents. One of them is of constant magnitude (potential) and is derived from two of the phase leads through the phase correcting condenser PH. The other is proportional to the current flowing through the resistance RE, this current being proportional to the load in the lift. If the lift load is a heavy opposing one, a large starting current flows through the resistance RE, the resulting current flowing in the second half of the primary of the transformer P being in phase with and therefore helping the current flowing in the first half of the primary. If on the other hand, the lift load is a helping one the starting current through the resistance RE may be small or even negative, i. e. it may be 180° displaced from the phase of the current in the first half of the primary. Whatever the starting current, a potential according thereto is induced in the secondary of the transformer P, this potential or current in the secondary of P being rectified by the rectifier RB, and applied via the switch contact bank G1 through the associated wiper controlled resistance RG to one coil of a lift load relay E.

As will be remembered, that during acceleration the wiper G1 is being stepped by the stepping magnet G over the contacts associated with it, these contacts being connected by tappings in such fashion to the resistance RG as rapidly to reduce the value of the resistance in series with the coil of lift load relay E. This stepping of the wiper of G1 increases the current passing through the coil of the lift load relay E until the latter operates, the time at which such operation takes place being determined by the potential being derived from the secondary of the transformer P, and hence from the current in the stator leads. When the lift load relay E operates, its contact $e_1$ locks it operated to contact $u_5$, and its contact $e_2$ opens the self-interrupting circuit of stepping magnet G so that the wipers of the switch cease to step. It may therefore be said that the wipers of the switch G have now been positioned at a point corresponding to the load in the lift.

Reverting to the rotor circuit, when the potential derived from transformer Q falls (soon after the motor starts) to such a value that the current through initiating relay T is insufficient to maintain the latter operated, this relay releases, and its contact $t_2$ by closing operates resistance relay R. The contacts $r_1$ and $r_2$ of this relay short circuit resistances SA, SB and SC, and the rotor runs up to full speed, driving the lift in the lift shaft.

Nothing further appears until a point some distance ahead of the floor at which stopping is required, is reached. The manual control key SU is then opened, though nothing further happens for the moment. At a predetermined distance ahead of each floor, an inductor plate (not shown) is provided in the shaft of the lift, this inductor plate being arranged to co-operate with an inductor relay Y carried by the lift. When the lift, in approaching the floor, passes the said inductor plate, inductor relay Y is momentarily operated, thereby opening its contact. Since control relay B is no longer held operated (key SU open) in series with relay U, it (relay B) is released by the opening of the contact of inductor relay Y, the contact $b_4$ of control relay B by opening, preventing re-operation of relay B when the inductor relay Y contacts re-close.

$b_1$, $b_2$ and $b_3$ by dropping back to their lower positions prepare circuits through the resistances SA, SB and SC of values such that the currents permitted by them to flow in the rotor circuit are commensurable with the load in the lift, i. e. if the load is large, the rotor currents will also be large, whereas if the load is small or helping, the rotor currents will be small.

$b_5$ by opening releases resistance relay R and switch starting V.

$b_6$ closing makes the circuit of the eddy current deceleration brake X and the latter is energised to a value also proportional to the load in the lift, through the wiper and bank G6 and resistance RH. This current is uni-directional, and is derived from the rectifier RA.

The lift now commences to slow down, the rate of deceleration being substantially independent of the load in the carriage.

When it reaches the desired floor, the inductor stop relay S operates from a further inductor plate (not shown) in the shaft, and its contact releases up relay U.

$u_1$ and $u_2$ by opening break the circuits of the stator, deenergizing the motor, and open the circuits of the holding brake magnet K and of the deceleration eddy brake X. The holding brake K, in releasing, clamps the lift shaft and stops the carriage.

$u_3$ by opening breaks the locking circuit of up relay U.

$u_5$ by opening releases lift load relay E.

$u_6$ closing restores a self-interrupting path for switch stepping magnet G via the interrupter contact $g$ and bank G2 to positive on $d6$. The switch steps by self-interruption to the first contact and there stops.

All the apparatus is now restored to a normal de-energized condition and is ready for a further traverse.

From the foregoing it will be seen that the lift is run to a floor and decelerated under the combined effect of three forces. These forces are due to the load in the lift the currents flowing in the rotor circuit, and the retarding effect of the eddy current deceleration brake. Since the two latter are varied automatically in relation to the former, each time the lift starts from rest, accurate levelling under all conditions is ensured.

Although it has been stated that the extent of energization of the eddy current deceleration brake is determined by the load-measuring wiper switch G, this is not entirely necessary. Thus if the said brake is energized to a fixed extent each time deceleration is required, the rotor current may be varied to a greater extent than would be the case with a variable brake, though we find that a smoother and more accurate slow-down is possible by varying both simultaneously as shown.

Again, although a manually started lift has been described, it should be understood that the invention may easily be applied to an automatically started or stopped lift such as one operating on the so-called "collector" principle, the only differences being those necessary to replace the hand-operated control keys SU and SD by call-storage, and floor selecting relays and/or switches of known type.

Finally, although it has been stated that the wiper switch G varies the resistances SA, SB and SC and RH directly through its contact banks, such a proceeding may not be advisable in the case of a lift taking large currents, in which case the switch wipers are arranged to operate contactors of known type which perform the necessary resistance adjustment. Circuit modifications of this nature, being obvious to those skilled in the art, are omitted for purposes of clarity, though we wish it to be understood that the scope of our invention covers all such obvious adaptations not requiring the exercise of invention.

We claim:—

1. A system of lift control comprising a lift motor having stator and rotor windings, a source of current, circuits including up and down contacts for energizing the stator windings from said source of current, starting resistances to be inserted in the circuits of the rotor windings during acceleration, deceleration resistance to be inserted in said circuits of the rotor windings during deceleration of the lift, tappings on said deceleration resistances cooperating with wipers of a step-by-step switch for adjusting the deceleration resistances according to the load in the lift, a stepping magnet for operating the wipers of said switch, a control relay, control relay contacts in the circuits of the rotor windings which when the control relay is deenergized connect said deceleration resistances in the circuits of the rotor windings and when said control relay is energized connect the starting resistances in said circuits of the rotor windings, up and down relays for operating the respective stator circuit contacts, up and down key contactors for energizing the respective up and down relays one at a time and simultaneously energizing said control relay, a relay arranged to be energized by current derived from the rotor circuits when said starting resistances are in the circuits of the rotor windings for starting operation of said stepping magnet so as to step the wipers of said switch and adjust the deceleration resistances and a relay arranged in a circuit deriving current from the circuits of the stator windings and adapted to be operated for stopping the operation of the stepping magnet, whereby the wipers are positioned so that the deceleration resistances are adjusted according to the load in the lift.

2. A system of lift control as in claim 1 wherein the circuit of said relay for stopping operation of the stepping magnet includes a resistance with tappings cooperating with a wiper of said step-by-step switch for cutting down the resistance in the relay circuit as the wipers are stepped until the current derived from the stator circuits is sufficient to operate said relay, thereby stopping the stepping of the wipers and positioning them according to the load in the lift.

3. A system of lift control as in claim 1 wherein a shaft supporting the rotor windings and driving the lift is provided with an eddy current brake for cooperation therewith during deceleration of the lift, said brake being in a circuit deriving current from the stator circuits, and including a contact operable by the control relay for opening the brake circuit when said control relay is energized and closing said circuit when the control relay is deenergized, whereby said eddy current brake is caused to function for retarding the lift during deceleration.

4. A system of lift control as in claim 1 wherein an eddy current brake arranged for retarding the rotor during deceleration of the lift is adapted to be energized by current derived from the stator circuits and circuit closing means is provided for energizing said brake simultaneously with and upon insertion of said deceleration resistances in circuit with the rotor windings when said control relay is deenergized.

5. A system of lift control as in claim 1 wherein an eddy current brake is arranged to cooperate with the rotor for retarding the lift during deceleration and is adapted to be energized by a circuit deriving current from the stator circuits, said brake circuit including an adjustable resistance comprising tappings cooperating with a wiper of said stepping switch so as to be adjusted by operation of said stepping magnet to vary the resistance in the brake circuit according to the load in the lift.

6. A system of lift control as in claim 1 wherein an eddy current brake and a holding brake, both deriving operating current from the stator circuits, are arranged to be deenergized when the respective up and down relays are deenergized for opening the corresponding contacts in the circuits of the stator windings.

7. A system of lift control as in claim 1 wherein relays are arranged to be energized from the circuits of the rotor coils when the motor is started for starting operation of the stepping magnet and for cutting out the starting resistances and these relays are adapted to be deenergized when said control relay is deenergized.

8. A system of lift control as in claim 1 wherein an induction relay is arranged to be operated by an inductor plate in the lift shaft for deenergizing said control relay when the lift is to be stopped at a floor.

9. A system of lift control as in claim 1 wherein an inductor relay is arranged to be operated by an inductor plate in the lift shaft for deenergizing an operated up or down relay and opening the circuits of the stator windings for stopping the lift motor.

10. A system of lift control as in claim 1 wherein the relay arranged to be operated by current derived from the circuits of the stator windings for positioning the wipers according to the load in the lift is provided with a holding circuit controlled by the respective up and down relays so that when an operated up or down relay is deenergized said lift load relay will be deenergized.

ALEXANDER ALBERT CHUBB.
NORMAN CAROL SMART.